United States Patent
Akasaka et al.

Patent Number: 5,673,354
Date of Patent: Sep. 30, 1997

[54] DISPERSION COMPENSATING OPTICAL FIBER

[75] Inventors: Youichi Akasaka; Ryuichi Sugizaki; Kunio Kokura, all of Ichihara, Japan

[73] Assignee: The Furukawa Electric Co. Ltd., Tokyo, Japan

[21] Appl. No.: 610,964

[22] Filed: Mar. 5, 1996

[30] Foreign Application Priority Data

Mar. 10, 1995 [JP] Japan ................................. 7-079719

[51] Int. Cl.$^6$ ................................................. G02B 6/02
[52] U.S. Cl. .................... 385/127; 385/123; 385/126; 359/109; 359/161
[58] Field of Search ................................ 385/123–127, 385/128; 359/109

[56] References Cited

U.S. PATENT DOCUMENTS

| | | | |
|---|---|---|---|
| 4,755,022 | 7/1988 | Ohashi et al. | 385/124 X |
| 5,550,948 | 8/1996 | Inniss et al. | 385/147 |
| 5,555,340 | 9/1996 | Onishi et al. | 385/127 |

OTHER PUBLICATIONS

Akasaka, Y., et al., Dispersion Compensating Fibers, C–135, Furukawa Electric Co., Ltd., publication date Sep. 26–29, 1994. No month.

*Primary Examiner*—Phan T. H. Palmer
*Attorney, Agent, or Firm*—Robert G. Lev

[57] ABSTRACT

A dispersion compensating optical fiber is proposed for application in a wavelength optical signal transmission system. This dispersion compensating fiber has a W shaped refractive index profile, and has a first core layer, a second core layer formed around the outside of the first core layer, and a cladding layer made of substantially pure silica formed around the outside of the second core layer. The first core layer is doped with germanium, so that its refractive index s increased by a proportional refractive index difference of about 2%. The second core layer is uniformly doped with fluorine, so that its refractive index is decreased by a proportional refractive index difference of about 0.58%. The ratio of the outer radius of the second core layer to the outer radius of the first core layer is about 2.5. The wavelength dispersion slope is in the negative region, the dispersion is made to be high negative dispersion, and moreover the dispersion slope compensation ratio from a wavelength of 1530 nm to a wavelength of 1570 nm is made to be a value close to the perfect dispersion ratio and about 0.75 to 1.25 thereof.

4 Claims, 3 Drawing Sheets

COMPARISON EXAMPLE

Fig. 5

DISPERSION COMPENSATING OPTICAL FIBER

CROSS REFERENCE TO RELATED APPLICATIONS

The subject matter of the present application is related to that in Ser. No. 08/527,083, now U.S. Pat. No. 5,568,583, issued Oct. 22, 1996, entitled "Dispersion Compensating Optical Fiber for Wavelength Multiplex Transmission and Method Using Same", incorporated herein by reference.

FIELD OF THE INVENTION

The present invention relates to a dispersion compensating optical fiber which is suitable for utilization when performing wavelength multiplex signal transmission of optical signals at a plurality of wavelengths, and which in particular compensates for wavelength dispersion when performing wavelength multiplex signal transmission at wavelengths of from 1530 nm to 1570 nm.

BACKGROUND OF THE INVENTION

A fiber optic network with zero dispersion at 1300 nm which uses single mode optical fibers which have zero dispersion at the wavelength of 1300 nm is per se known as an fiber optic network for signal transmission. By transmitting optical signals at a wavelength of 1300 nm using this fiber optic network, a received signal waveform which has almost zero dispersion can be obtained at a receiving end, and high reliability optical signal transmission can be performed.

Recently wavelength multiplex signal transmission, in which optical signals (pulse modulated optical signals) are transmitted at a plurality of wavelengths, has been performed using this already installed fiber optic network with zero dispersion at 1300 nm. When performing wavelength multiplex signal transmission using wavelengths in the vicinity of 1550 nm via an already installed fiber optic network which has zero dispersion at 1300 nm, about 17 ps/nm/km of dispersion is produced, and this is an obstacle to long distance signal transmission. Wavelength dispersion can be either positive dispersion or negative dispersion. Positive dispersion is a phenomenon which occurs in the case in which, as the wavelength becomes greater, the refractive index of the optical signal transmission path becomes smaller so that the speed of light therein becomes greater; in this case, the pulse width becomes wider in correspondence with the amount of this increase in the speed of light. On the other hand, negative dispersion is a phenomenon which occurs in the opposite case in which, as the wavelength becomes greater, the refractive index of the optical signal transmission path becomes greater so that the speed of light therein becomes less; in this case, the pulse width becomes wider in correspondence with the amount of this decrease in the speed of light.

A typical already installed fiber optic signal transmission network with zero dispersion at 1300 nm has about 17 ps/nm/km of dispersion at wavelengths in the vicinity of 1550 nm, as explained above. When performing long distance signal transmission using such a transmission network over, for example, a distance such as 100 km, dispersion of about 1700 ps/nm must be coped with at the signal receiving end. For this reason, if an attempt is made to perform high density high speed signal transmission with fine wavelength division in the vicinity of 1550 nm, as described above, since the dispersion is great, signals at any one wavelength and signals at other wavelengths become superimposed, and difficulties arise in separation of these signals, so that the problem arises that the reliability of optical signal transmission is deteriorated.

In the prior art, in order to prevent the increase of the mount of wavelength dispersion of this type, it has been known to interpose a dispersion compensating optical fiber into the optical signal transmission path, so as to compensate the amount of dispersion at a specified wavelength.

This type of dispersion compensating optical fiber has negative dispersion, and increase in the mount of dispersion at the characteristic wavelength for optical transmission can be prevented by using the negative dispersion of this dispersion compensating optical fiber to cancel out the positive dispersion of an optical fiber which has zero dispersion at the wavelength of 1300 nm.

OBJECT AND SUMMARY OF THE INVENTION

However, such prior art dispersion compensating optical fibers have positive values for dispersion slope (the ratio of change in the dispersion to change in the wavelength) at the specified wavelengths for use. When using this type of dispersion compensating optical fiber, it is possible to perform dispersion compensation for any specific wavelength, but the mount of dispersion increases for other wavelengths, and for this reason such fibers are not suitable dispersion compensating optical fibers in applications such as performing wavelength multiplex signal transmission.

The present invention has been made with a view to solving the above described problem, and its object is to provide a dispersion compensating optical fiber which can compensate for wavelength dispersion over a range of wavelengths from 1530 nm to 1570 nm simultaneously and also effectively, and which is therefore capable of being employed in wavelength multiplex signal transmission at wavelengths from 1530 nm to 1570 nm using an already installed fiber optic signal transmission network with zero dispersion at 1300 nm.

In order to attain this object, the present invention proposes a single mode optical waveguide type dispersion compensating optical fiber having a W shaped three layer refractive index profile, comprising: a first generally cylindrical core centre core layer of radius a1 and refractive index n1; a second generally hollow cylindrical core layer of external radius a2 and refractive index n2 formed on the outside of the first core layer and generally coaxial therewith; and a generally hollow cylindrical cladding layer of refractive index n3 formed on the outside of the second core layer and generally coaxial with both the first and the second core layers; wherein: a2/a1 is between approximately 2 and approximately 4; n1>n3>n2; the proportional refractive index difference of the first core layer with respect to the cladding layer, as expressed by $\{(n_1^2-n_3^2)/2n_1^2\}\times 100$, is between approximately 1.6% and approximately 2.1%; the proportional refractive index difference of the second core layer with respect to the cladding layer, as expressed by $\{(n_2^2-n_3^2)/2n_2^2\}\times 100$, is between approximately $-0.60\%$ and approximately $-0.45\%$; and whereby the dispersion slope compensation ratio, obtained by dividing the ratio of the dispersion slope of this dispersion compensating optical fiber to the dispersion slope of a single mode optical fiber from a wavelength of 1530 nm to a wavelength of 1570 nm, by the ratio of the dispersion value of this dispersion compensating optical fiber to the dispersion value of a single mode optical fiber at a wavelength of 1550 nm, is between approximately 0.75 and approximately 1.25.

Further, a particular preferred specialization of the present invention proposes a dispersion compensating optical fiber as described above, wherein the first core layer is formed substantially from GeO2—SiO2, the second core layer is formed substantially from F-SiC2, and the cladding layer is formed substantially from SiO2.

According to the present invention, it has been possible to propose a single mode optical waveguide type dispersion compensating optical fiber having a W shaped refractive index profile which has negative dispersion slope and which moreover has a high negative dispersion value. Moreover, by stipulating that the value of the proportional refractive index difference of the first core layer with respect to the cladding layer, the value of the proportional refractive index difference of the second core layer with respect to the cladding layer, and the value of the ratio of the radiuses of the first core layer and the second core layer all fall within their respective ranges specified as above, it becomes possible to ensure that the dispersion slope compensation ratio, obtained by dividing the ratio of the dispersion slope of this dispersion compensating optical fiber to the dispersion slope of a single mode optical fiber from a wavelength of 1530 nm to a wavelength of 1570 nm, by the ratio of the dispersion value of this dispersion compensating optical fiber to the dispersion value of a single mode optical fiber at a wavelength of 1550 nm, is a value between 0.75 and 1.25 of its theoretical value, i.e. is a value near the perfect compensation ratio (=1).

For this reason it is possible, by utilizing the optical fiber of the present invention as a dispersion compensating optical fiber for wavelength multiplex signal transmission in an optical signal transmission path which has positive dispersion, very efficaciously to cancel the large mount of dispersion at various wavelengths which occurs in the optical signal transmission path, and it is possible to ensure that the wavelength dispersion signal received at the signal receiving end is small. By doing this, it is possible remarkably to enhance the reliability of high density high speed wavelength multiplex signal transmission.

Further, when performing wavelength multiplex signal transmission using wavelengths in the vicinity of 1550 nm (from 1530 nm to 1570 nm) via an already installed fiber optic signal transmission network with zero dispersion at 1300 nm, in the same manner, the wavelength dispersion at various wavelengths of the transmitted optical signal at the receiving end can be effectively canceled by compensation, by using a dispersion compensating optical fiber of the present invention as interposed in the optical signal transmission path. By doing this, it becomes possible to perform wavelength multiplex signal transmission using the above described already installed fiber optic signal transmission network with zero dispersion at 1300 nm at high density and high speed with a high reliability around the vicinity of a wavelength of 1550 nm.

For example, when a dispersion compensating optical fiber according to the present invention is inserted into an already installed fiber optic signal transmission network with zero dispersion at 1300 nm for performing wavelength multiplex signal transmission therein, and wavelength multiplex signal transmission is performed using wavelengths in the vicinity of 1550 nm, the optical signals of various wavelengths which have passed along the network of optical fibers which have zero dispersion at 1300 nm arrive at the start of this dispersion compensating optical fiber after having undergone great dispersion. The dispersion compensating optical fiber according to the present invention has a W shaped refractive index profile, and moreover simultaneously has both high negative dispersion and also a negative dispersion slope, and furthermore is formed so that its dispersion slope compensation ratio has a value which is in the vicinity of the perfect compensation ratio which can compensate perfectly for the dispersion slope of a single mode optical fiber, and is greater than 0.75 and less than 1.25 thereof. For this reason, the large amount of positive dispersion which is generated by passing through the above described signal transmission network with zero dispersion at 1300 nm can efficiently be compensated for and canceled by the large negative dispersion and the negative dispersion slope of the dispersion compensating optical fiber of the present invention. Due to this, the mount of dispersion in the optical signals of various wavelengths which have passed through the dispersion compensating optical fiber of the present invention is a value close to zero, and as a result signal separation of the various wavelengths at the signal receiving end can be accurately performed, and thus wavelength multiplex signal transmission can be performed at high density and high speed with a high reliability.

BRIEF DESCRIPTION OF THE DRAWINGS

These and other objects and advantages of the present invention will become more apparent and more readily appreciated from the following detailed description of an exemplary embodiment of the invention, taken in conjunction with the accompanying drawings, in which.

DETAILED DESCRIPTION OF THE PREFERRED EMBODIMENT

Figure 1:
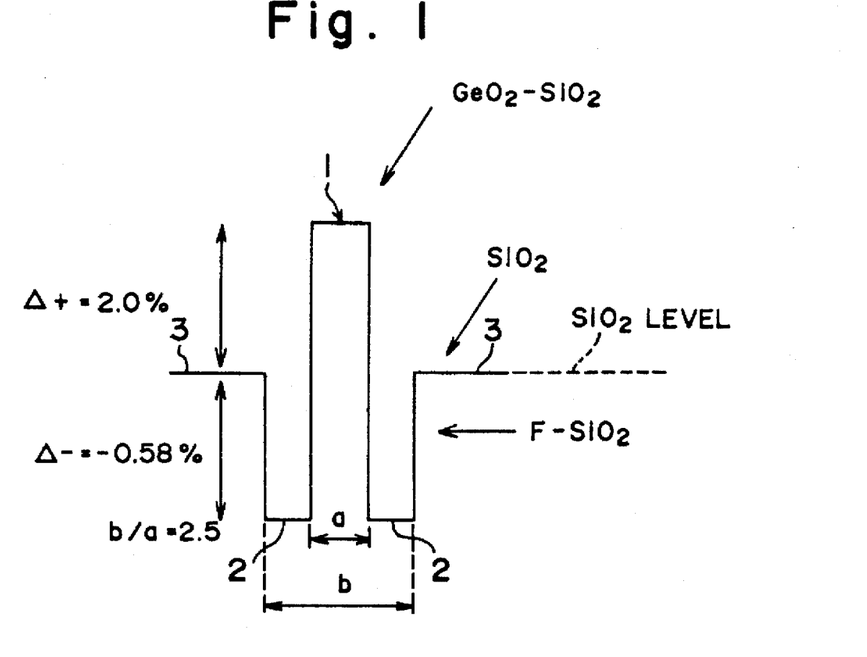
FIG. 1 is an explanatory view showing the structure of the refractive index profile of the preferred embodiment of the dispersion compensating optical fiber of the present invention.
Figure 2:
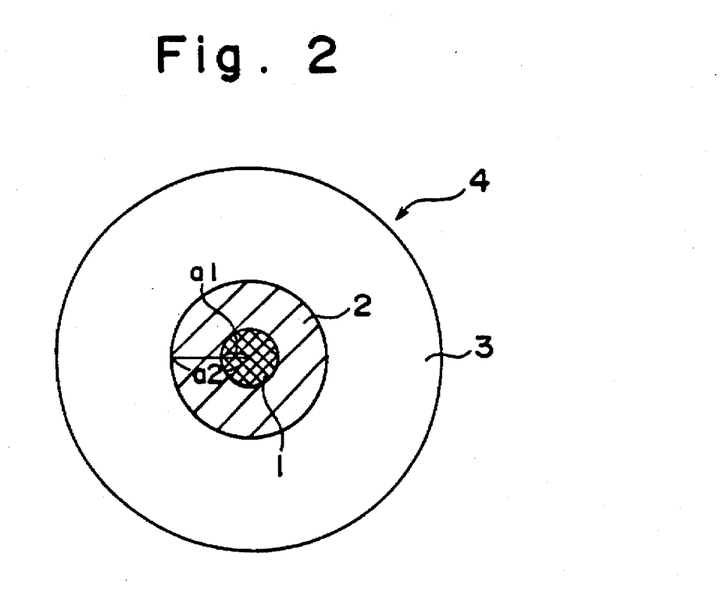
FIG. 2 is a transverse sectional view of this dispersion compensating optical fiber of the preferred embodiment.

The preferred embodiment of the present invention will now be explained with reference to the figures. FIG. 2 is a transverse sectional view showing the construction of the preferred embodiment of a dispersion compensating optical fiber according to the present invention, while FIG. 1 is a diagram showing the distinctive refractive index profile of this optical fiber.

As shown in these figures, a hollow cylindrical second core layer 2 of radius a2 and diameter b is formed on the outside of, and coaxial with, a cylindrical first core center core layer 1 of radius a1 and diameter a. And on the outside of this second core layer 2 there is formed a hollow cylindrical cladding layer 3, coaxial with the first core layer 1 and the second core layer 2, and these three layers 1, 2, and 3 together constitute a dispersion compensating optical fiber 4. The ratio a2/a1 between the radiuses of the second core layer 2 and the first core layer 1, and likewise the ratio b/a between their diameters, is about 2.5. Further, with the refractive index of the first core layer 1 being termed n1, the refractive index of the second core layer 2 being termed n2, and the refractive index of the cladding layer 3 being termed n3, the condition n1>n3>n2 holds, so that the dispersion compensating optical fiber 4 is a single mode optical waveguide type optical fiber which has a W shaped three layer refractive index profile.

The cladding layer 3 is formed from pure silica (SiO2). The first core layer 1 is formed from GeO2—SiO2, i.e. is doped with germanium Ge which increases its refractive index, so that the proportional refractive index difference delta1 (deltaplus) of this first core layer 1 with respect to the cladding layer 3, as expressed by $\{(n_1^2-n_3^2)/2n_1^2\}\times 100$, is approximately equal to 2.0%. Further, the second core layer 2 is formed from F-SiO2, i.e. is uniformly doped with fluorine F which decreases its refractive index, so that the proportional refractive index difference delta2 (deltaminus) of this second core layer 2 with respect to the cladding layer 3, as expressed by $\{(n_2^2-n_3^2)/2n_2^2\}\times 100$, is approximately equal to –0.58%.

Figure 4:
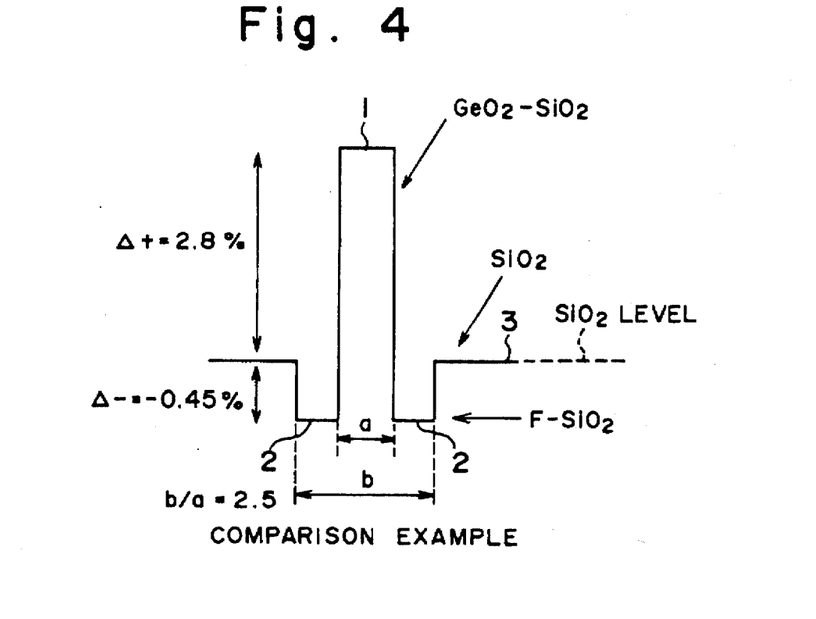
FIG. 4 is an explanatory view, similar to FIG. 1 for the preferred embodiment, showing the structure of the refractive index profile of the above described comparison example optical fiber.

Moreover, in FIG. 4, there is shown a refractive index profile of an exemplary comparison optical fiber (not according to the present invention), which has a W shaped refractive index profile similar to the dispersion compensating optical fiber of this preferred embodiment described above, but whose values for the refractive index differences delta1 and delta2 are different from those of this preferred dispersion compensating optical fiber 4 of this comparison example, the first core layer 1 is doped with germanium Ge which increases its refr refractive index difference delta is approximately equal to 2.8%, while the second core layer 2 is equally doped with fluorine F which decreases its refractive index so that its proportional refractive index difference delta is approximately equal to –0.45%. The outside of this second core layer 2, in the same manner as with the above described preferred embodiment, is surrounded with a cladding layer 3 which is formed of pure quartz (pure silica), and the ratio b/a between the diameters of the second core layer 2 and the first core layer 1 is similarly set to about 2.5.

Now, the present applicant has performed the following calculations in order to specify the conditions, according to the present invention, for the above described dispersion compensating optical fiber of the construction shown in FIGS. 1 and 2. First, with the ratio between the diameters of the second core layer 2 and the first core layer 1 being set to about 2:5, the values D of the dispersion and the values S of the dispersion slope were obtained by calculation, when the proportional refractive index difference delta1 between the first core layer 1 and the cladding layer 3, and the proportional refractive index difference delta2 between the second core layer 2 and the cladding layer 3, were set to the values shown in Table 1. And, from these values, in each case there were calculated the ratio XS (XS=SD/SS) of the dispersion slope SD of the dispersion compensating optical fiber in question to the dispersion slope SS (0.058 ps/nm²/km) of a single mode optical fiber (a 1300 nm zero dispersion fiber) from a wavelength of 1530 nm to a wavelength of 1570 nm, and the dispersion slope compensation ratio (XS/XD) obtained by dividing this value XS by the ratio XD (XD= DD/DS) of the dispersion value DD of the dispersion compensating optical fiber in question to the dispersion value DS (17 ps/nm/km) of a single mode optical fiber at a wavelength of 1550 nm. Plots of this dispersion slope compensation ratio between the wavelengths of 1530 nm and 1570 nm with respect to cutoff wavelength are shown in FIG. 5 for the three cases of Table 1.

TABLE 1

Figure 5:
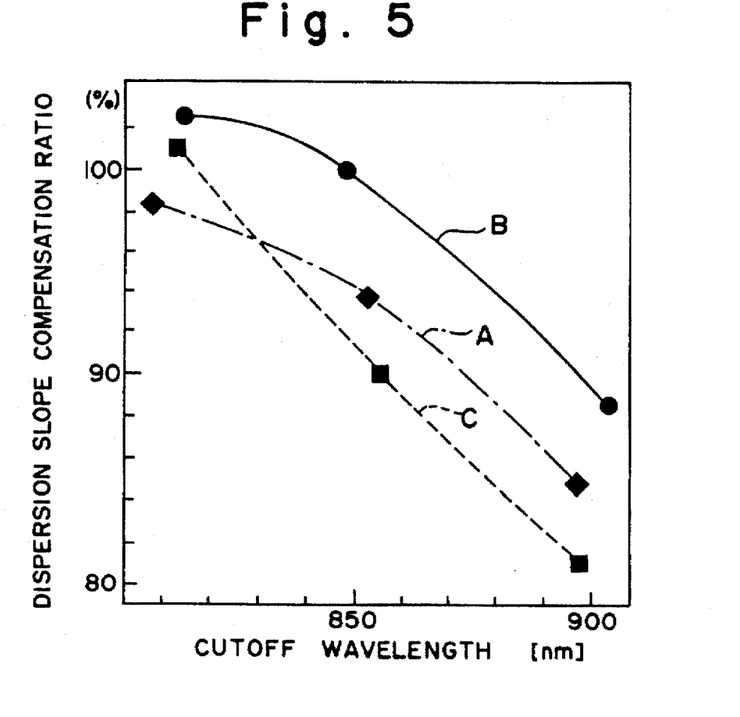
FIG. 5 is a graph showing, by values of dispersion slope compensation ratio with respect to cutoff wavelength, for various dispersion compensating optical fibers which have W shaped refractive index profiles, how the dispersion slope compensation ratio differs according to difference of proportional refractive index difference.

| | Δ 1% | Δ 2% | Symbol denoting characteristic graph in FIG. 5 |
|---|---|---|---|
| 1 | 2.5 | –0.7 | A |
| 2 | 2.0 | –0.58 | B |
| 3 | 1.3 | –0.36 | C |

Moreover, the following equations were used for calculating the above dispersion D and the above dispersion slope S:

$$D = (k/c)\frac{dM2}{dK} + (k/c)\left(\frac{d(M1-M2)}{dK}\right)\frac{d(V\cdot B2)}{dV} + \left\{\frac{M1-M2}{C}\right\}V\frac{d^2(V\cdot b)}{dV^2} \quad (1)$$

$$S = \frac{dD}{d\lambda} \quad (2)$$

The symbols used in the above calculations have the following meanings:

C: speed of light

K: the wave number in the media space n1: refractive index of the first core layer 1 n3: refractive index of the cladding layer 3 delta: proportional refractive index difference between the first core layer 1 and the cladding layer 3

V: $(K\cdot n_1\cdot\alpha(2\Delta))^{1/2}$ a: diameter of first core layer 1

MI: $d(K\cdot n_1)/dK$

M2: $d(K\cdot n_3)/dK$

B: normalized variable

λ: wavelength

Further, the above described cutoff wavelength is calculated by a per se known function from the components: the ratio of the refractive index n1 of the first core layer 1 and the refractive index n2 of the second core layer 2, a constant which is calculated from the ratio of the diameter of the first core layer 1 and the diameter of the second core layer 2; the core radiuses; and the proportional refractive index difference between the first core layer 1 and the second core layer 2.

As will be clear from these calculation results, whatever combination is made of the values for the proportional refractive index differences delta1 and delta2 shown in Table 1, the values calculated for the dispersion slope compensation ratio at wavelengths from 1530 nm to 1570 nm fall between 80% and 104% as shown in the FIG. 5 graph, which, it will be understood, are in the range of from 75% up to 125%, which is specified in the Main Claim as being the target for this dispersion slope compensation ratio.

However, when the present applicant has actually constructed various dispersion compensating optical fibers having refractive index differences delta1 and delta2 as shown in Table 1, has connected them to optical fibers with zero dispersion at 1300 nm, and has assessed the dispersion compensation results actually achieved in practice, the following results have been obtained. For the dispersion compensating optical fiber (1) of Table 1, since the value of delta2 was comparatively large and negative, the resulting light confinement was weak, and for this reason the loss increase was very striking, and therefore it was concluded that this fiber could not be utilized in practical applications. Further, for the dispersion compensating optical fiber (3) of Table 1, since the mount of dispersion compensation was undesirably extremely small, in order to use this optical fiber for dispersion compensation for a 1300 nm zero dispersion optical fiber, it would be necessary to make the length of the dispersion compensating optical fiber extremely long with respect to the length of the 1300 nm zero dispersion optical fiber. It has thus been verified that this fiber, as well, cannot be utilized in practical applications.

However, in the case of the dispersion compensating optical fiber (2) of Table 1, since the dispersion value at a wavelength of 1550 nm is −132 ps/nm/km, a sufficiently large negative dispersion is obtained, and moreover it has been checked that there is no increase of loss due to Rayleigh scattering in the wavelength region up to about 1600 nm. Accordingly, the dispersion value of a 1300 nm zero dispersion optical fiber and the dispersion slope thereof can be simultaneously and also efficiently compensated, and it has thus been verified that this fiber can be utilized effectively in practice.

In this connection, the present applicant has manufactured dispersion compensating optical fibers while varying the values of the proportional refractive index differences delta1 and delta2 in various ways, and has performed evaluation thereof, in order to specify the construction of a dispersion compensating optical fiber which has both a high negative dispersion and a negative dispersion slope, and moreover whose above described dispersion slope compensation ratio falls between 75% and 125%, which can be properly applied in practice when employed as connected to a 1300 nm zero dispersion fiber. The following results were obtained. When delta1 has a value greater than about 2.1%, it is necessary for the value of delta2 to be less than about −0.60%, but setting the value of delta2 less than −0.60% means that the process of manufacture is very difficult in practice, and moreover if this is done the light confinement is weak, and it has been verified that such fibers are not suitable for practical application, since the value of dispersion and the value of dispersion slope undergo great deviations. Further, when delta1 has a value less than about 1.6%, it is necessary for the value of delta2 to be greater than about −0.45%, but if this is done the total proportional refractive index difference becomes small, and due to this the absolute value of the mount of negative dispersion becomes small, and the length of dispersion compensating optical fiber which is required in order to compensate for the dispersion of a fiber such as described above which has zero dispersion at 1300 nm becomes extremely long, which again means that such a dispersion compensating optical fiber cannot be used in practice for dispersion compensation.

Further, to consider the value of the parameter which is the ratio a2/a1 of the radiuses of the first core layer 1 and the second core layer 2 (or b/a, the ratio of their diameters), when various dispersion compensating optical fibers were made in practice and evaluation of their performance was performed as described above, if the value of a2/a1 was less than about 2, then although according to calculation a region existed in which compensation could be satisfactorily performed with respect to the dispersion slope, in practice there was no proper effectiveness for light confinement, and the dispersion values deviated greatly from those obtained theoretically, and the loss also became great, so that it was verified that such fibers were not suitable for practical application. Further, if the value of a2/a1 was greater than about 4, then the contribution of waveguide dispersion light which has a W shaped refractive index profile became small, and for this reason a negative dispersion slope could not be obtained in practice, and it was verified that it was not possible effectively to compensate for the dispersion slope of a zero dispersion fiber using such a dispersion compensating optical fiber.

With the preferred embodiment of the present invention, based upon these practical results, the construction of the dispersion compensating optical fiber has been so specified that: the range of the proportional refractive index difference delta1 of the first core layer 1 with respect to the cladding layer 3 is +1.6%≦delta1≦+2.1%; the range of the proportional refractive index difference delta2 of the second core layer 2 with respect to the cladding layer 3 is −0.6%≦delta2≦−0.45%; and the range of the ratio of the radiuses of the first core layer 1 and the second core layer 2 is 2≦a2/a1≦4. And in concrete terms, as described above, for the preferred embodiment, delta1=2.0%, delta2=−0.58%, and a2./a1=b/a=2.5. Further, for the above described comparison example dispersion compensating optical fiber 4 which was shown in FIG. 4, the value of the proportional refractive index difference delta1 was greatly different from the range specified above for the present invention.

Figure 3A:
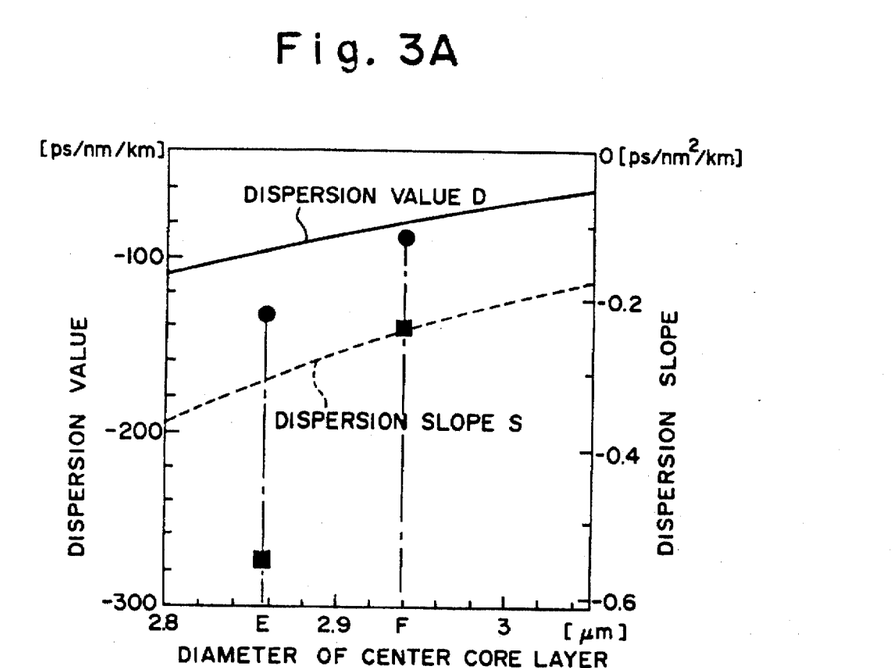
FIG. 3A is a graph showing theoretically derived values of the dispersion and of the dispersion slope for a first core layer of the dispersion compensating optical fiber of the preferred embodiment over a range of radiuses of this core layer, and actually measured values of these parameters at two particular such core radiuses.

In FIG. 3A there are shown, for the dispersion compensating optical fiber 4 of this preferred embodiment, the calculated values (the theoretical values) for the dispersion slope S and for the dispersion value D over a range of values of the radius a1 of the first core layer 1. There are also shown (by black squares) the actually measured values for the dispersion slope and (by black circles) the actually measured values for the dispersion value, at two actual values E and F of the radius a1 of the first core layer 1 which pertain to dispersion compensating optical fibers which were actually manufactured in practice and whose performance was measured. Further, in FIG. 3B there are shown, in the same manner, for the comparison example dispersion compensating optical fiber 4 of FIG. 4, the theoretical values over a range of radius values, and a pair of actual values (at radius values G and H), for the dispersion slope and for the dispersion value, for two such comparison example optical fibers which were actually manufactured.

Figure 3B:
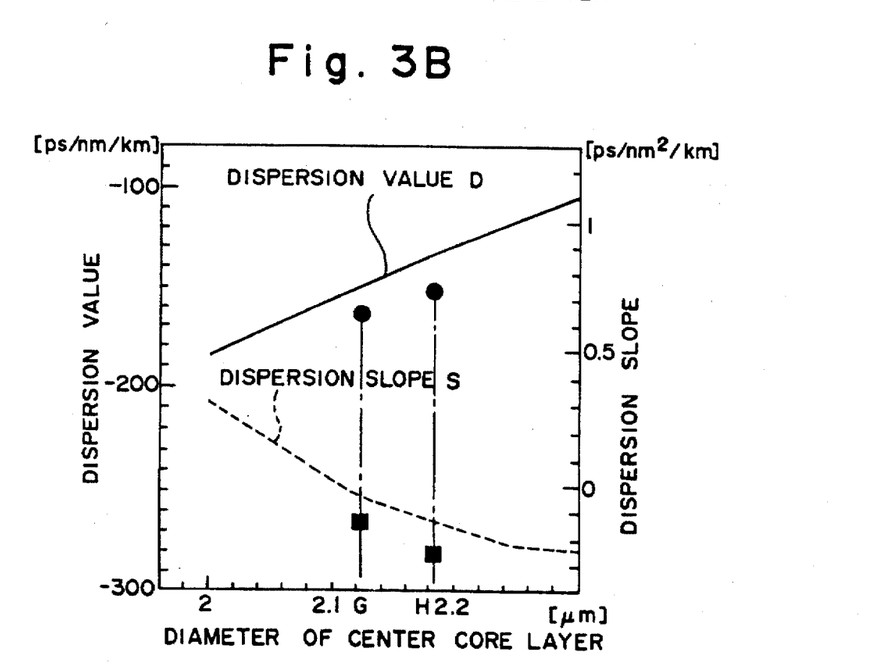
FIG. 3B is a graph similar to FIG. 3A, showing theoretically derived values of the dispersion and of the dispersion slope for a first core layer of a comparison example optical fiber (which is not an embodiment of the present invention) over a range of radiuses of this core layer, and actually measured values of these parameters at two particular such core radiuses.

Further, in Table 2 there are shown the collected results for the actually measured values for the radius vales E through H of FIGS. 3A and 3B, and the dispersion slope compensation ratios obtained based upon these actually measured values. Now, in Table 2, α is the ratio of the dispersion value D of the dispersion compensating optical fiber 4 to the dispersion value at a wavelength of 1550 nm of a single mode optical fiber (a zero dispersion optical fiber at 1300 nm), while 1S is the ratio of the dispersion slope S of the dispersion compensating optical fiber 4 to the dispersion slope from a wavelength of 1530 nm to a wavelength of 1570 nm of a single mode optical fiber (a zero dispersion optical fiber at 1300 nm).

TABLE 2

|  |  | Radius of First Core Layer (μm) | Dispersion Value (ps/nm/km) | Dispersion Slope (ps/nm²/km) | α (D/17) | β (S/0.058) | Dispersion Slope Compensation Ratio % |
| --- | --- | --- | --- | --- | --- | --- | --- |
| Preferred Embodiment | E | 2.856 | −132.8 | −0.5492 | −7.81 | −9.469 | 121 |
| Embodiment | F | 2.940 | −89.7 | −0.239 | −5.276 | −4.121 | 78 |
| Comparison | G | 2.124 | −163.3 | −0.129 | −9.6 | −2.22 | 23 |
| Embodiment | H | 2.184 | −152.0 | −0.249 | −8.94 | −4.29 | 48 |

As is clear from these results, the dispersion compensating optical fiber 4 of this preferred embodiment is a dispersion compensating optical fiber which has been constructed to have a W shaped refractive index profile, and has a high negative dispersion and a negative dispersion slope; and, further, by setting the ranges of the values of its proportional refractive index differences delta1 and delta2 and the range of the ratio a2/a1 between the radiuses of its first core layer 1 and its second core layer 2 within the suitable respective ranges described above, thereby the dispersion slope compensation ratio from a wavelength of 1530 nm to a wavelength of 1570 nm is brought into the ideal range of between 0.75 and 1.25 (between 75% and 125%) in the vicinity of the perfect compensation ratio, and moreover no difficulties are encountered in fabrication of this optical fiber, and the effectiveness for light confinement is also excellent. Accordingly, it is possible in this way to manufacture a dispersion compensating optical fiber which can be exploited for practical applications, and which has desirable negative values for dispersion and for dispersion slope.

For this reason, by inserting this dispersion compensating optical fiber into an optical signal transmission path which includes a positive dispersion optical fiber which has zero dispersion at a wavelength of 1300 nm or the like, the large positive dispersion which is produced in this optical signal transmission path is effectively compensated, and the dispersion of various wavelengths at the signal receiving side is compensated to a small value—desirably, to a dispersion of almost zero. Moreover, the normal positive dispersion slope of an optical signal transmission path is effectively compensated, so that scattered change of the wavelength dispersion at the signal receiving side for various wavelengths is suppressed, and the beneficial effect is obtained that it is possible to keep the wavelength dispersion within a small scattering range.

Further, when using an optical fiber, which has already been installed as an optical signal transmission path and which has zero dispersion at a wavelength of 1300 nm, for the purpose of performing wavelength multiplex signal transmission at 1530 nm to 1570 nm, the length of the dispersion compensating optical fiber 4 according to the present invention is adjusted in order to bring the dispersion at various wavelengths near to zero dispersion, and then, by connecting this fiber 4 to the already installed zero dispersion optical fiber, the dispersion of the optical signal transmission path can effectively be compensated for, and the dispersion at each wavelength can be brought within the range of +0.25 ps/nm/km; and it has been checked in practice that it is possible to receive an optical signal of low dispersion.

Now, the present invention is not to be considered as being limited to the preferred embodiment disclosed above; various changes of the form of any particular embodiment may be made, without departing from the scope of the invention. For example, in the above described preferred embodiment the first core layer 1 was formed from GeO2—SiO2, the second core layer 2 was formed from F—SiO2, and the cladding layer 3 was formed from SiO2; but the materials for the first core layer 1, the second core layer 2, and the cladding layer 3 are not to be considered as being limited to those described above, since any suitable materials may be employed, as appropriate.

Further, in the dispersion compensating optical fiber of the present invention, as long as the proportional refractive index differences delta1 and delta2, and the ratio a2/a1 of the radiuses of the first core layer 1 and the second core layer 2, fall within their respective ranges as specified by the main claim, i.e. as long as +1.6%≦delta1 ≦2.1%, −0.60%≦delta2≦−0.45%, and 2≦a2/a1>4, and as long as the dispersion slope compensation ratio from a wavelength of 1530 nm to a wavelength of 1570 nm is between 0.75 and 1.25, then it is possible to set the actual values of these parameters, i.e. the actual values of the proportional refractive index differences delta1 and delta2 and of the ratio a2/a1 of the radiuses, and the actual diameters of the first core layer 1, the second core layer 2, and the cladding layer 3, to any suitable values, provided that they do not deviate from their specified ranges.

Accordingly, although the present invention has been shown and described in terms of the preferred embodiment thereof, it is not to be considered as limited by any of the perhaps quite fortuitous details of this embodiment or of the drawings, but only by the terms of the appended claims, which follow.

What we claim is:

1. A single mode optical waveguide type dispersion compensating optical fiber having a W shaped three layer refractive index profile, comprising:

a first generally cylindrical core layer of radius a1 and refractive index n1;

a second generally hollow cylindrical core layer of external radius a2 and refractive index n2 formed on the outside of said first core layer and generally coaxial therewith;

and a generally hollow cylindrical cladding layer of refractive index n3 formed on the outside of said second core layer and generally coaxial with both said first and said second core layers;

wherein:

a2/a1 is between approximately 2 and approximately 4;

n1>n3>n2;

the proportional refractive index difference of said first core layer with respect to said cladding layer, as expressed by $\{(n_1^2 - n_3^2)/2n_1^2\} \times 100$, is between approximately 1.6% and approximately 2.1%;

the proportional refractive index difference of said second core layer with respect to said cladding layer, as expressed by $\{(n_2^2-n_3^2)/2n_2^2\}\times 100$, is between approximately −0.60% and approximately −0.45%; and: whereby the dispersion slope compensation ratio, obtained by dividing the ratio of the dispersion slope of this dispersion compensating optical fiber to the dispersion slope of a single mode optical fiber from a wavelength of 1530 nm to a wavelength of 1570 nm, by the ratio of the dispersion value of this dispersion compensating optical fiber to the dispersion value of a single mode optical fiber at a wavelength of 1550 nm, is between approximately 0.75 and approximately 1.25.

2. A dispersion compensating optical fiber according to claim 1, wherein said first core layer is formed substantially from GeO2—SiO2, said second core layer is formed substantially from F—SiO2, and said cladding layer is formed substantially from SiO2.

3. An optical communication system in which a dispersion compensating optical fiber is optically coupled to an optical transmission line of an optical fiber having substantially zero dispersion at a transmission wavelength of 1,300 nm, said dispersion compensating optical fiber being a single mode optical waveguide type dispersion compensating optical fiber having a W-shaped three layer refractive index profile, comprising:

a first generally cylindrical core layer of radius $a_1$ and refractive index $n_1$;

a second generally hollow cylindrical core layer of external radius $a_2$ and refractive index $n_2$ formed on the outside of said first core layer and generally coaxial therewith; and a generally hollow cylindrical cladding layer of refractive index $n_3$ formed on the outside of said second core layer and generally coaxial with both said first and second core layers; wherein:

$2.5 < a_2/a_1 \leq 4$;

$n_1 > n_3 > n_2$;

the proportional refractive index difference of said core layer with respect to said cladding layer as expressed by $\{(n_1^2+n_3^2)/2n_1^2\}\times 100$, is between approximately 1.6% and approximately 2.1%; and the proportional refractive index difference of said second core layer with respect to said cladding layer as expressed by $\{(n_2^2-n_3^2)/2n_2^2\}\times 100$, is between approximately −0.60% and approximately −0.45%;

whereby the dispersion compensation ratio, obtained by dividing the ratio of the dispersion slope of this dispersion compensating optical fiber to the dispersion slope of a single mode optical fiber from a wavelength of 1,530 nm to a wavelength of 1,570 nm, by the ratio of the dispersion value of this dispersion compensation optical fiber to the dispersion value of a single mode optical fiber at a wavelength of 1,550 nm, is between approximately 0.75 to approximately 1.25.

4. A single mode dispersion compensating optical fiber having a three layer W-shaped refractive index profile, comprising:

a first generally cylindrical core layer of radius $a_1$ and having a refractive index $n_1$;

a second generally hollow cylindrical core layer of external radius $a_2$ and having a refractive index $n_2$ formed on the outside of said first core layer and generally coaxial therewith; and a generally hollow cylindrical cladding layer of refractive index $n_3$ formed on the outside of said second core layer and generally coaxial with both said first and said second core layers, wherein $a_2/a_1$ is between approximately 2.5 and approximately 4; $n_1 > n_3 > n_2$;

the proportional refractive index difference of said first core layer with respect to said cladding layer, as expressed by $\{(n_1^2-n_3^2)/2n_1^2\}\times 100$ is between approximately 1.6% and approximately 2.1%, the proportional refractive index difference of said second core layer with respect to said cladding layer, as expressed by $\{(n_2^2-n_3^2)/2n_2^2\}\times 100$, is between approximately −0.60% and approximately −0.45%, and whereby the dispersion slope compensation ratio, obtained by dividing the ratio of the dispersion slope of this dispersion compensating optical fiber to the dispersion slope of a single mode optical fiber from a wavelength of 1530 nm to a wavelength of 1570 nm, by the ratio of the dispersion value of this dispersion compensating optical fiber to the dispersion value of a single mode optical fiber at a wavelength of 1550 nm, is between approximately 0.75 and approximately 1.25.

* * * * *

UNITED STATES PATENT AND TRADEMARK OFFICE
CERTIFICATE OF CORRECTION

PATENT NO. : 5,673,354
DATED : September 30, 1997
INVENTOR(S) : Akasaka, et al

It is certified that error appears in the above-identified patent and that said Letters Patent is hereby corrected as shown below:

| | |
|---|---|
| Column 2, line 11 | "mount" should read -- amount -- |
| Column 2, line 26 | "      " |
| Column 3, line 33 | "      " |
| Column 4, line 13 | "      " |
| Column 7, line 10 | "mount" should read -- amount -- |
| Column 7, line 52 | "      " |
| Column 8, line 39 | "Coy" should read -- (by -- |
| Column 9, line 14 | "dear" should read -- clear -- |
| Column 9, line 34 | "mason" should read -- reason -- |
| Column 10, line 28 | "$2 \leq a2/a1 > 4$" should read -- $2 \leq a2/a1 \leq 4$ -- |

Signed and Sealed this

Tenth Day of March, 1998

Attest:

BRUCE LEHMAN

Attesting Officer

Commissioner of Patents and Trademarks